Patented Jan. 7, 1947

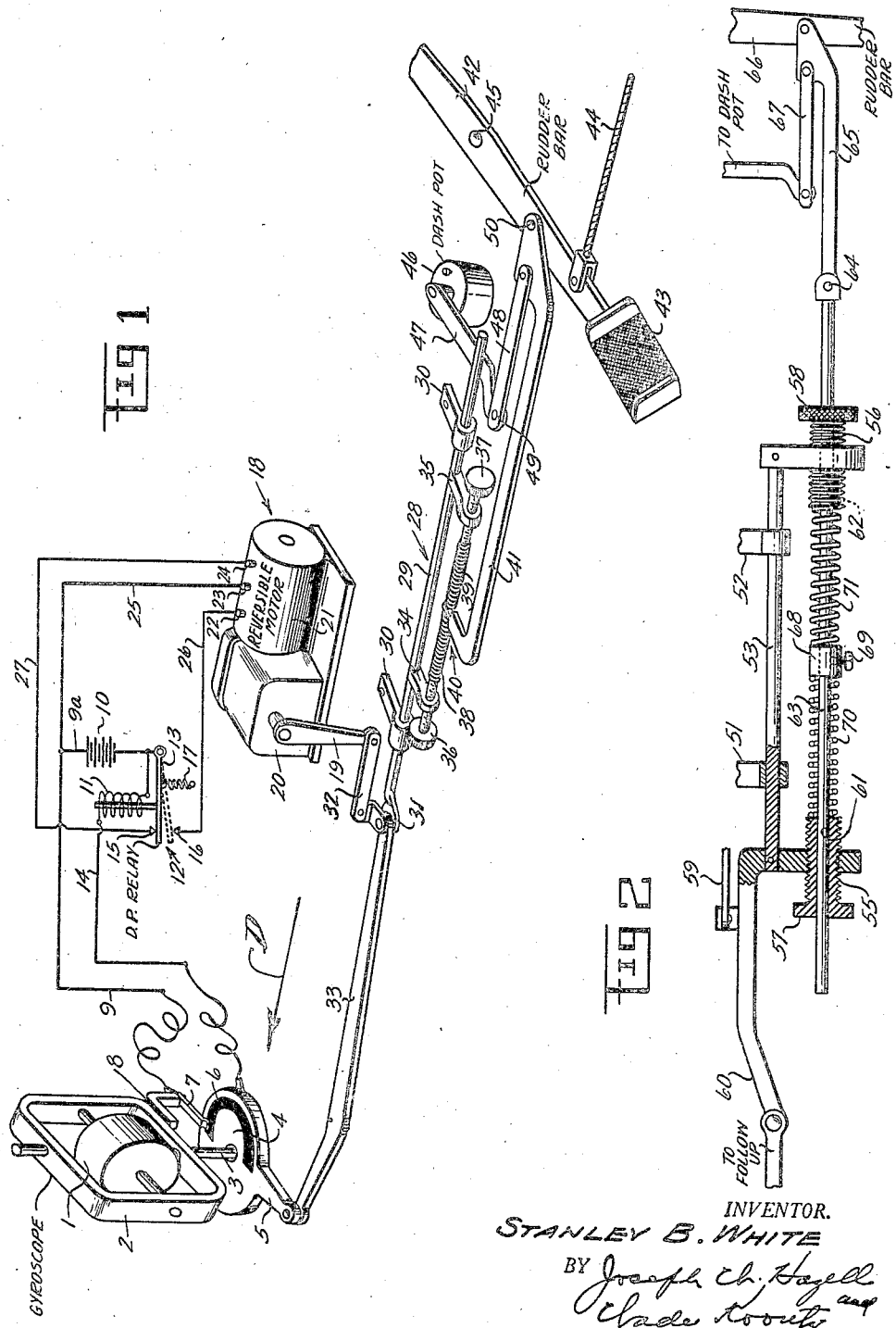

2,413,739

UNITED STATES PATENT OFFICE 2,413,739

DIRECTION-CONTROLLING APPARATUS

Stanley B. White, Dayton, Ohio

Application February 19, 1945, Serial No. 578,755

9 Claims. (Cl. 172—282)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to improvements in direction-controlling apparatus for aircraft, dirigible vehicles, and the like, and more particularly to gyroscope controlled steering apparatus having a continuously oscillating motor actuated connection with the steering means for the craft or vehicle.

In dirigible vehicles, particularly small aircraft, it is quite common to utilize a gyroscope controlled motor for controlling the direction of travel of the craft, or vehicle, this motor or the control surface actuated thereby having a "follow-up" connection to an electrical circuit controlling pickoff device operatively associated with the gyroscope so as to maintain the position of the motor actuated steering element at a predetermined reference position with respect to the spin axis of the gyroscope rotor to maintain the craft being controlled, on its course.

In order to maintain the relative position of the direction-controlling element, such as the rudder, ailerons, or elevators, within a minimum departure from the reference position with respect to the direction of the gyroscope rotor spin axis, and to reduce the departure of the craft from its predetermined course to a minimum, an electrical pickoff control is often employed, without what is known as a "dead spot" or middle position where the motor, which is controlled by the pickoff device and connected to the steering or direction-controlling element for actuation thereof, will not be actuated. If a "dead spot" type of the pickoff control device is employed, the "dead spot" is usually so small or narrow with respect to the circuit-closing contact, carried by the rotor gimbal that any departure between the position of the gyroscope rotor spin axis and the pickoff element in either direction will cause one or the other of the operating circuits controlling the motor to be closed, effecting a corresponding adjustment of the steering control surface in one direction or the other which results in the corresponding adjustment of the pickoff control means to move the "dead spot" back toward the gimbal carried electrical contact member.

In the first-mentioned type of electrical pickoff control means, without the "dead spot," the motor is continuously oscillated, an "on and off," or double pole relay being employed electrically connected to the motor for reverse operations thereof, the motor energized through the relay by the pickoff means so that the motor, and the direction-controlling surface actuated thereby, are in a state of continuous oscillation, moving in one direction or the other, depending upon whether the energizing circuit to the relay is closed or open. The pickoff element usually includes a circular contact plate or ring, one-half of which is electrically non-conductive, and the gimbal means for the rotor carries a flexible circuit-closing contact which is either in circuit-closing contact with the semicircular electrically conductive part of the pickoff control element, closing the relay circuit, or is in contact with the semicircular nonconductive part, breaking the relay circuit. The mean reference position between the oscillation limits of the motor, with respect to the gyroscope rotor spin axis is identical, and while this type of direction control is accurate in its direction-controlling characteristics, it is objectionable as now used, since the motor and all connections between the motor and the direction-controlling surface are in a state of rapid oscillation.

Modern, small high-speed aircraft respond instantly to the slightest adjustments of the steering or direction-controlling surfaces and the oscillations communicated to the craft employing the type of control just referred to is disturbing to the pilot and crew of the plane, the oscillation being so rapid as to constitute vibration, also continuous, unnecessary, and objectionable stresses are placed on the aircraft structure, particularly the control surface hinges and operating connections, soon causing wear on these continuously-moving control elements and connections which results in extreme looseness at the hinged connections, and stretch of the actuating cables, making the connections so "sloppy" that the accuracy of this type of control system is lost.

With the "dead spot" control system, more generally employed, where the "dead spot" is very small, the direction-controlling characteristics are nearly as accurate as the aforementioned system, with the result that the same disadvantages are present. The reason for this is that the relative movements between the pickoff and gyroscope reference tend to overshoot the "dead spot" area with the result that oscillations of the motor and control surfaces are usually present in this system although not quite so rapid or of as great a magnitude as in the first-mentioned system.

My improved control apparatus permits the employment of either of the aforementioned control systems, with the elimination of all of the objections and disadvantages set forth above. An aircraft employing my apparatus can be maintained accurately on a predetermined course, by gyroscope control apparatus employing an "on or off" type of pickoff control with a continuously-oscillating motor for actuating the direction control surfaces, with no discomfort to the pilot or crew, with a minimum degree of stress and wear on the craft, and on its direction-controlling elements.

An object of the present invention is the provision of operating means between a gyroscope-controlled motor and a direction-controlling surface, so that an oscillating type of gyroscope-controlled motor may be employed for actuating the direction-controlling surfaces without the oscillations being communicated to the control surfaces.

Another object is the provision of oscillation dampening-out means between an oscillating type of steering control power actuator and a steering control actuating member for dampening out and absorbing the rapid oscillations of the power actuator, and maintaining the steering control surface actuator in a mean reference position with respect to the mean point between the oscillation limits of the power actuator.

A further object is the provision of hydraulic dampener means located between a gyroscope-controlled motor of the oscillating type and a direction-controlling surface for a dirigible aircraft, for maintaining the control surface in predetermined direction-controlling positions, and dampening out the oscillations aforesaid, including resilient actuating means connected between the motor and the controlling surface for adjusting the controlling surfaces to a mean reference position with respect to a mean position between the limits of oscillations of said motor.

A further object is the provision of means for adjusting the degree of yieldability of said resilient actuating means, and for adjusting the relative reference position of the direction-controlling surface with respect to the mean position of the oscillating steering control actuator between the limits of its oscillations.

Other objects and advantages of the invention will become apparent from the following description, taken in connection with the accompanying drawing, in which like reference characters refer to like parts in the several figures.

Fig. 1 is a somewhat diagrammatic perspective view, illustrating my improved steering control means as applied to a conventional directional gyroscope-controlled motor actuator, employing an oscillatory type of control system.

Fig. 2 is a fragmentary perspective view, illustrating a somewhat modified form of resilient actuator, and more clearly disclosing my improved adjusting means for varying the degree of resiliency of the actuator, and for changing the reference position of the steering control surface with respect to the mean position between the oscillation limits of the motor device.

Referring to Fig. 1 of the drawing, the reference numeral 1 denotes a gyroscope having means, not shown, for rotating a gyroscope rotor which is gimbaled within a gimbal frame 2, on a shaft 3. This gyroscope device diagrammatically illustrates a conventional direction-controlling type, having an adjustable reference position and electrical circuit-controlling contact means, without a "dead spot," so that a single control circuit may be provided which controls the direction of rotation of a motor, the circuit being either open to operate the motor in one direction or closed to operate the motor in reverse direction, depending upon the relative position of the spin axis of the rotor and its departure from the position in one direction or the other. The gyroscope device is provided with a disc-shaped pickoff control member, indicated at 4, composed of the electrically-conductive material and freely journaled for rotative movement with respect to the axis of the shaft 3, and insulated therefrom. The disc 4 carries an actuating arm 5 projecting therefrom for rotatably adjusting the position of the disc, or for oscillating the disc concentrically about its axis, the disc having fixedly secured thereon, a semi-circular insulating strip 6.

The gimbal frame 2 has mounted thereon a light flexible electrical contact spring or arm 7, insulated from the gimbal frame by insulation 8. The free end of the contact spring 7 is movable in contact with the upper face of the disc 4, establishing electrical contact with the disc, or movable into contact with the semicircular insulating strip 6, depending upon relative movement between the contact spring 7 and the disc in one direction or the reverse direction, past a predetermined reference plane. When the disc 4, or the gimbal frame 2 is shifted with respect to each other past the predetermined reference plane passing through the axis of shaft 3 and the arm engages the nonconductive strip 6, the arm 7 breaks the electrical control circuit.

A conductor wire 9 is flexibly connected at one end to the contact arm 7, and at the other end to a conductor 9a, connecting one terminal of a current source or battery 10. The other terminal of the battery is connected to an energizing coil 11 of a double pole relay device 12, and to the circuit-controlling contact armature 13. The other terminal of the energizing coil 11 of the relay 12 is connected by a flexible conductor 14 to the electrical conductive disc 4 of the pickoff control element. The relay device 12 is provided with spaced contact terminals 15 and 16, disposed for alternate contact with a contact armature 13, depending upon whether the coil 11 is energized or not. A light actuating spring 17 urges the contact armature 13 into contacting engagement with the contact terminal 16, when the relay coil 11 is not energized.

The reference numeral 18 denotes a conventional type of reversible motor device having an actuating arm 19, a reduction gear box 20 for actuating the arm and a reversible motor 21 for actuating the gear train (not shown) in the gear box 20, the motor 21 being provided with control circuit terminals 22, 23, and 24. A conductor 25 connects the common return circuit terminal 23 of the motor to the short conductor 9a, leading to one side of the power source or battery 10. Conductors 26 and 27 lead from the motor terminals 22 and 24 to the double pole relay circuit controlling terminals 16 and 15 of the relay device 12. When the relay 12 is energized, current flows through the conductors 27 and 25, the motor 21 rotates to swing the arm 19 in one direction. When the relay device is deenergized due to the movement of the insulating strip 6 under the contact arm 7, the actuating spring raises the relay armature, closing the circuit through the conductors 26 and 25, and the motor is rotated in the opposite direction, moving the actuating arm 19 in the opposite direction.

My improved control apparatus, indicated generally at 28, includes a longitudinally reciprocatable bar member 29, mounted in suitable guide bearings 30 secured to the framework or other support (not shown) on the craft carrying the control device. The bar member 29 has an apertured head 31, connected by a link member 32 to the arm 19 of the motor 18, and by a follow-up control link member 33, to the arm 5 projecting from the electro-conductive disc 4. The bar member 29 has a pair of spaced, laterally projected arms 34 and 35 formed thereon, the ends of these arms being apertured on a common axis, and threaded, to receive the threaded adjustable thumb screws 36 and 37. The inner or adjacent ends of the threaded thumb screws each have swivelly-connected thereto, one end of one of the two tension springs 38 and 39. The adjacent ends of the two springs 38 and 39 are connected, in any suitable convenient manner, to a laterally bent extremity 40 of a direction control member actuating link element 41. The other end of this link 41, is connected to a direction-controlling element 42, illustrated as a rudder bar, having the usual steering pedals 43, and cables 44, leading to the rudder member or steering control surface, the rudder bar pivot being indicated at 45. I preferably employ a dash-pot device or hydraulic dampener 46, which may be of conventional well-known construction, having an arm 47 controlled thereby. A link connection 48 is connected at 49 to the arm 47 of the dash-pot 46 at one end, and at its other end to the link element 41, adjacent to or at the pivot connection 50 between the link element and the rudder bar 42.

Referring now to Fig. 2 of the drawing, disclosing a slightly modified form of control mechanism, I provide a pair of suitable guide bearings 51, 52, rigidly mounted on the craft or vehicle carrying my device. A bar member 53 is mounted for longitudinal reciprocation in the guide bearings 51, 52, the bar having laterally extending arms 53 and 54, similar to the arms 34 and 35 which project from the bar member 28, in Fig. 1. The arms 53 and 54 are threaded preferably on a common axis to receive a pair of threaded adjustable sleeve guide bearings 55, 56, having knurled adjusting flanges 57, 58 for adjusting the respective sleeve bearings 55 and 56 axially in the arms 53 and 54.

The bar member 53 is connected to a motor device by a link member 59, in a manner similar to that disclosed in Fig. 1, and a follow-up connection or link 60 is also provided, adapted to be connected to a gyroscope pickoff disc such as the pickoff 4 of Fig. 1. Slidably received in the aligned bores 61, 62, formed in the exteriorly-threaded sleeve bearings 55 and 56, is a direction control surface actuating rod 63, having an enlarged actuating head at one end, to which is connected, as indicated at 64, the rudder bar or other steering control actuating link element 65, having its opposite end connected to the rudder bar or other control surface actuator 66 in the same manner as disclosed in Fig. 1. The dash-pot or vibration dampener link connection 67, similar to the link connection 48 in Fig. 1, is also employed. The rod 63 has a spring seat or collar 68 secured thereon, intermediate the opposing ends of the threaded sleeve bearings 55 and 56, a set screw 69 being provided securing the collar on the rod against relative axial displacement.

Compression coil springs 70 and 71 are disposed on the rod 63 with their respective ends seated against the ends of the threaded sleeves 55 and 56, and the opposite faces of the collar 68.

Adjustment of the two threaded sleeves 55 and 56 regulates the tension of the springs 70 and 71, and, as a result, regulates the degree of yieldability between the oscillating gyroscope control actuating means and the control surface actuator 66. Adjustment of any one of the sleeves 55 or 56 with respect to other or remaining sleeve adjusts the mean reference position of the collar 68. Adjustments of the threaded rods 34 and 35 in Fig. 1 produces the same results.

*Operation*

In the operation of the invention on a straight flight, with the gyroscope control illustrated in the drawing, the spin axis of the gyroscope, and therefore the gimbal 2 and its contact 7, remains relatively fixed in space. The double pole relay 12 is either energized, to close one operating circuit to the servomotor, swinging the motor arm 19 in one direction, as when the gyro contact 7 is in engagement with the pickoff disc electrical contact surface, or the relay is deenergized, energizing the other motor operating circuit, to cause the motor arm 10 to swing in the opposite direction.

As the arm 19 moves, the link 33 connected thereto actuates the pickoff 4 relatively moving the same with respect to the contact 7, toward the end of the semicircular insulating strip 6, until the contact 7 engages the strip and the relay circuit is broken (or closed), reversing the circuit to the motor. The motor is therefore in a state of continuous oscillation and since the control surface actuating member (rudder bar 42) is connected to the arm 19 by the resilient yieldable connection, including the rod 29, springs 38 and 39 and the rod or bar 41, there is a tendency to cause the rudder bar 42 to be oscillated continuously. The dash-pot or hydraulic dampener 46, being connected to the bar 41 adjacent its connection 50 to the rudder bar, the oscillations of the rudder bar will be damped out by the dampener device 46, so as to prevent the rudder bar from following the substantially rapid predetermined oscillations of the motor, but will maintain the bar 4 at a substantially mean position between the limits of the oscillations of the bar 29. In negotiating a turn, the oscillations at one side of the reference position will be longer or greater than the oscillations at the other side, establishing a new mean reference position for the rudder bar 12.

The two thumb screws 36 and 37 may be adjusted to either decrease or increase the resiliency of the springs 38 and 39, to vary the degree of yieldability between the arm and the rudder bar. The dash-pot may also be adjusted to vary the degree of dampening effect of the dash-pot 46 on the rudder bar movements.

Adjustment of one of the thumb screws 36 or 37 with respect to the other, changes the mean position between oscillation limits of the bar 29 so that the mean reference position of the rudder bar may be changed or adjusted with respect to the reference position of the gyro spin axis. Adjusting both thumb screws 36 and 37 in the same direction also changes the relative mean position of the steering control surface actuator, or rudder bar 12, with respect to the mean position between oscillations of the bar member 29.

While I have illustrated and disclosed my invention in the form of a simple apparatus for purposes of illustration it is obvious that certain detail changes in the mechanical constructions, combinations and arrangements of the parts may

I claim:

1. In aircraft direction-controlling apparatus, means for controlling the direction of travel of an aircraft including a gyroscope, an oscillating motor and follow-up means therefor having a mean reference position controllable by said gyroscope, a movable direction-controlling element carried by the aircraft yieldably connected to said motor for operation thereby and oscillation dampening means connected to said direction-controlling element for dampening out oscillations between said connection and said movable direction-controlling means, for maintaining said direction-controlling means in a mean reference position with respect to the mean position between the limits of oscillation of said motor means.

2. In a dirigible vehicle direction-controlling apparatus a vehicle having direction-determining means movably carried thereon, including a gyroscope, a motor controlled thereby having follow-up means for maintaining said motor in oscillation with respect to a gyroscope mean reference position, resiliently yieldable operating connection means between said motor and the vehicle direction-determining means, oscillation dampening means connected to said vehicle direction-determining means for dampening out predetermined oscillations in said operating connection between said motor and said vehicle direction-determining means, and means for adjusting the degree of resilient yieldability in said operating connection between said motor and said vehicle direction-determining means.

3. In aircraft direction-determining apparatus, a direction-controlling gyroscope, motor means controlled thereby having an operating arm for moving an aircraft direction control surface actuator to control the direction of movement of the aircraft, follow-up means between said arm and the gyroscope for moving said motor means in accordance with the movement of the said gyroscope, a resilient operating connection, adapted to be connected between said motor arm and said aircraft direction-control surface actuator and dash-pot means connected to said resilient operating connection adjacent the control surface actuator for retarding movement of said aircraft direction-control surface actuator with respect to said arm to dampen out predetermined oscillations of said motor operating connection arm intermediate the arm and the control surface actuator.

4. In combination with a direction-controlling gyroscope for controlling the direction of travel of an aircraft, or other dirigible vehicle, having pickoff control means and a motor controlled thereby having control surface actuating means, shiftable in predetermined ratio to shifting movements of the direction controlling gyroscope, and steering means to controlling the direction of travel of the aircraft, of a resilient yieldable operating connection between said motor control surface actuating means and said steering means for yieldably moving said steering means in accordance with the movement of said motor actuating means, and yieldable movement dampening means connected through said yieldable operating connection to said steering means, for dampening out rapid oscillatory movement of said motor actuating means before said movement can be communicated to said steering means.

5. In combination with a direction-controlling gyroscope for controlling the direction of travel of an aircraft, or other dirigible vehicle, having pickoff control means and a motor controlled thereby having control surface actuating means, shiftable in predetermined ratio to shifting movement of the direction controlling gyroscope, and steering means controlling the direction of travel of the aircraft, of a resilient yieldable operating connection between said motor control surface actuating means and said steering means for yieldably moving said steering means in accordance with the movement of said motor actuating means, yieldable movement dampening means connected through said yieldable operating connection to said steering means, for dampening out rapid oscillatory movement of said motor actuating means before said movement can be communicated to said steering means, and means for adjusting the degree of yieldability of said resilient yieldable operating connection between the motor control surface actuating means and said steering means.

6. In an aircraft flight direction control means having a direction-controlling gyroscope, pickoff control means therefor, and a motor reversely operable under control of said pickoff control means, said motor having a direction-control surface actuating arm oscillatable with respect to the position of said direction-controlling gyroscope, a steering control actuating member for an aircraft, an operating connection between said direction-control surface actuating arm and said steering control actuating member for operating the steering control actuating member from the motor, resilient means intermediate the ends of said operating connection, and movement dampening out means connected to said operating connection intermediate the resilient means therein and said steering control member, for dampening out predetermined oscillations between the motor steering control actuating arm and said steering control actuating member.

7. Apparatus as claimed in claim 6, in which said operating connection between the motor arm and said steering control member comprises a two-part link member having a pair of spaced arms projecting from one of the parts and an arm on the other part disposed intermediate the spaced arm with resilient means yieldably connecting the intermediate arm to the two spaced arms.

8. Apparatus as claimed in claim 6, in which said operating connection comprises a two-part telescopic link having a pair of spaced arms projecting from one of said parts, and an arm on the other part disposed intermediate the spaced arms, with resilient means adjustably disposed intermediate said arms.

9. Apparatus as claimed in claim 6, in which said operating connection comprises a two-element relatively movable link having a pair of spaced arms projected from one of said elements and an arm on the other element disposed intermediate the spaced arms of the link, with resilient means yieldably and adjustably disposed intermediate the arms, and in which said movement dampening means comprises a dash-pot dampening member to yieldably retard free movement of the portion of said element of the link that is adapted to be connected to said steering control means.

STANLEY B. WHITE.